United States Patent Office 3,832,223
Patented Aug. 27, 1974

3,832,223
METHOD OF TREATING FRESH HYDRAULIC CEMENTITIOUS COMPOSITIONS
Sanford M. Wohl, Cleveland, Ohio, assignor to The Tremco Manufacturing Company, Cleveland, Ohio
No Drawing. Filed May 22, 1972, Ser. No. 255,829
Int. Cl. C04b 25/02
U.S. Cl. 117—123 E                 5 Claims

ABSTRACT OF THE DISCLOSURE

Method of curing and waterproofing a body of fresh hydraulic cementitious composition, e.g. concrete, by separately directing toward an exposed surface of the fresh body, an aqueous emulsion of a film forming material, e.g. rubberized asphalt, and a chemical coagulant for the emulsion thereby forming a coagulum in situ on the exposed surface of the body in the nature of a membrane having low vapor transmitting properties and/or resistance to liquid water penetration.

---

This invention relates to the art of treating fresh hydraulic cementitious compositions, and more particularly to a method of curing and of waterproofing such compositions.

The invention is particularly applicable to concrete compositions and will be described with particular reference thereto. However, it will be appreciated that the invention has broader implications and may be used advantageously in the treatment of other hydraulic cementitious compositions such as cement, mortars, sand mixes, lutes and the like.

Concrete is composed of sand, gravel, crushed rock or other aggregate, held together by the hydration products of a paste of hydraulic cement and water. The thoroughly mixed ingredients when properly proportioned make a plastic mass which can be cast or molded into a predetermined size and shape. The concrete sets into a stone like mass by hydration of the cement by the water.

In general, the recommended water/cement ratios are established to provide more water than is theoretically needed to hydrate the cement. In field practice, however, evaporation of water frequently reduces the water/cement ratio to a point where there remains in the concrete insufficient water to completely hydrate the cement. Since concrete develops its strength through hydration, such evaporation losses results in concrete having less than maximum strength properties.

As a practical matter, it is virtually essential either to retard the evaporation of water from the fresh concrete, or to periodically replenish the evaporated water during the setting or curing period of the concrete. In some instances these practices are combined.

One of the simplest, if least efficient ways of ensuring adequate water for hydration is to periodically spray water or "pond" water on the exposed surfaces of the concrete. In some instances, burlap, straw or sand are spread over the exposed surfaces of the concrete to retard evaporation of water. In some instances soil-soaker hoses are employed to maintain a constant stream of water across the exposed surfaces of the concrete.

Because these procedures are inefficient in terms of manpower requirements and in some cases water costs, curing by coating the exposed surfaces of the fresh concrete with sealing compounds has received favorable attention. For this purpose pigmented solvent solutions of oils, waxes and resins have been used. Upon evaporation of the solvent the residues form vapor barriers in the nature of membranes on the exposed surfaces of the concrete. A reasonably well formed membrane will conserve enough of the water originally contained in the concrete mix to obviate the need for replenishing the water, thus eliminating both the manpower requirements during the curing of concrete, and the equipment and materials cost of applying replacement water.

The sealing compounds employed by the prior art were designed to remain intact for about twenty-eight days. According to government studies (Concrete Manual, U.S. Department of Interior, Bureau of Reclamation, 6th Edition, 1956, page 319) applying sealing compounds at the rate of 150 square feet per gallon on a reasonably smooth surface will provide the equivalent of fourteen days of continuous moist curing if a sealing membrane is kept intact for twenty-eight days.

The membranes formed from these prior art sealing compounds were of a more or less temporary nature and were not intended to serve any useful function after the concrete cured.

One aspect of the present invention is addressed to a method of curing a body of concrete, with a curing or sealing material which forms in situ on the fresh concrete a membrane of low vapor transmitting properties, which is permanent.

Another aspect of the present invention is concerned with waterproofing concrete. In many placements, such as below grade footings and foundations, roofs, promenade decks and the like, it is necessary to render one or more surfaces of the concrete structure waterproof. Heretofore this has been accomplished by applying a waterproofing material to the cured concrete. Some of the materials employed for this purpose include butyl rubber sheet, lead sheet, tar modified polymers, and in roofing applications, standard built-up roofs which consist of alternating layers of saturated roofing felt and bituminous mastic, covered by a traffic surface, for example, crushed stone or other aggregate.

The prior art practice required that workmen return to the job site after the concrete had cured to apply the waterproofing material, and also necessitated that work on the treated concrete be delayed until after the waterproofing material had hardened, as in cases where it was applied as a liquid.

These problems are obviated by an aspect of the present invention which is concerned with a method of waterproofing concrete, while it is fresh, by applying thereto materials which form in situ on the exposed surfaces of the body of concrete, a waterproofing membrane.

Another aspect of the invention relates to a method of curing a body of fresh concrete, while simultaneously providing the resultant hardened concrete with a waterproof covering.

More specifically, the present invention is directed in part to a method of curing a body of fresh hydraulic cementitious composition, which comprises separately directing toward an exposed surface of the body, an aqueous emulsion of at least one film forming material capable of producing a coagulum possessing low vapor transmitting properties, and a chemical coagulant for the emulsion, whereby a membrane of low vapor transmitting properties is formed in situ on the exposed surface of the body.

In accordance with another aspect of the present invention there is provided a method of waterproofing a hydraulic cementitious composition which comprises separately directing toward an exposed surface of a body of fresh hydraulic cementitious composition, an aqueous emulsion of at least one film forming material capable of producing a coagulum resistant to penetration by liquid water, and a chemical coagulant for said emulsion, whereby a waterproofing membrane is formed in situ on the exposed surface of said body while it cures.

In accordance with a further aspect of the present invention there is provided a method of curing a body of fresh hydraulic cementitious composition while simultaneously providing the resultant hardened composition with a waterproof covering, which comprises separately directing toward an exposed surface of the body, an aqueous emulsion of at least one film forming material capable of producing a coagulum possessing low vapor transmitting properties and resistance to liquid water penetration, and a chemical coagulant for said emulsion, whereby a waterproof membrane of low vapor transmission is formed in situ on the exposed surface of the body.

The advantages of curing a body of fresh hydraulic cementitious compositions, such as concrete, in accordance with the present invention are, first, that the membrane is formed very rapidly without requiring the evaporation of solvent, second, it releases water to the curing concrete which tends to offset the minor evaporation losses which may take place, and, third, it provides the concrete, prior to full cure with a permanent covering.

The principal advantage of waterproofing hydraulic cementitious compositions, such as concrete, in accordance with the present invention is that it permits the application of the waterproofing agent while the concrete is in its fresh, uncured state. This eliminates the costly and time consuming process of applying a waterproofing agent after the concrete has cured.

It is therefore an object of the present invention to provide an improved method of treating a body of fresh hydraulic cementitious composition, such as concrete.

A further object of the invention is to provide an improved method of curing a body of fresh hydraulic cementitious composition.

Yet another object of the invention is to provide an improved method of waterproofing a body of hydraulic cementitious composition while it is in a fresh and uncured state.

A further object of the invention is to provde a method for curing a body of fresh hydraulic cementitious composition while simultaneously providing the resultant hardened composition with a waterproof covering.

Still another object of the invention is to provide a method of treating a body of fresh concrete by forming in situ thereon a film forming coagulum from an aqueous emulsion composition.

These and other objects and advantages of the invention will become apparent from the following detailed description thereof, including a disclosure of the best mode presently contemplated for practicing the invention.

The method of the present invention is practiced by separately directing toward an exposed surface of a body of fresh hydraulic cemetitious composition, such as concrete, an aqueous emulsion of at least one film forming material capable of producing a coagulum which is resistant to penetration by liquid water, or which possesses low vapor transmitting properties, or both, and a chemical coagulant for the emulsion whereby a waterproof, and/or low vapor transmitting membrane is formed in situ on the exposed surface of the body of fresh concrete.

As a preferred class of aqueous emulsion compositions are those which comprise a major proportion of an aqueous bituminous emulsion and a minor proportion of a material selected from the group consisting of natural and synthetic rubber latices, and mixtures thereof.

For purposes of this disclosure the term "bituminous" is intended as a generic expression, embracing naturally occurring asphalt, petroleum derived asphalt, as well as coal derived bitumens, e.g. tars and pitches, shale oil residues and mixtures of the foregoing.

In general, any bituminous material having a melting point in the range of about 85 to about 160° F. and a penetration of about 30 to about 200 can be used, Asphaltic materials are preferred but coal-derived tars and pitches, shale or residues as well as compatible mixtures of the foregoing are also contemplated. Straight run materials as well as solvent cut-backs have the melting point and penetration inspections falling within the above ranges may also be used.

Instead of preparing a bituminous emulsion ingredient, any one of a number of commercially available emulsions may be used in the practice of the invention. One such is emulsion RS–1 manufactured by Emulsified Asphalt Products of Chicago, Ill.

The rubber latex ingredient may be formed by emulsifying natural rubber, but is preferably formed by emulsifying one of a number of synthetic rubbers. Included in the latter group are butadiene-styrene copolymers, polychloroprenes, (neoprenes), butadiene-acrylonitrile copolymers, organic polysulfides, etc. Polychloroprenes represent the preferred synthetic rubbers because of their excellent weathering properties and ready availability.

A number of commercially available rubber latices may be employed. Two of these are Neoprene 650 from Du Pont and Baypren MKB 58 (a polychlorobutadiene) from Farbenfabriken Bayer.

Suitable emulsifying agents for forming oil-in-water emulsions are well known to those skilled in the art. Representative examples include alkali soaps, resin soaps, rosin soaps, casein, proteins and the like. These materials will emulsify bituminous as well as rubber particles. It is usually desirable to employ the same emulsifying agent for both types of materials to ensure compatibility and reduce raw material costs.

Suitable compositions of sprayable consistency will contain from about 98 to about 65 wt. percent of an aqueous bituminous emulsion containing from about 65 to about 75 wt. percent solids; and from about 2 to about 35 wt. percent aqueous rubber latex containing from about 55 to about 65 wt. percent solids. The admixture of emulsion and latex is conveniently made by adding the smaller quantity of latex to the larger quantity of bituminous emulsion with stirring until homogeneity is obtained.

Conventional stabilizing agents such as caseinates, alginates, ammonium hydroxide and the like, may advantageously be added if the emulsion is to be stored for any significant period of time.

As the coagulant, any of a large number of water soluble salts and acids may be used, with the caveat that one be selected which does not excessively degrade the hydraulic cementitious composition. By way of example only, operative coagulants include calcium chloride, sodium chloride, hydrochloric acid and aluminum sulfate. In connection with the foregoing caveat however, aluminum sulfate should be avoided where the cementitious composition treated is sulfate sensitive.

A suitable coagulant can be prepared by forming from about a 4 to about 6 wt. percent solution of calcium chloride and water. This solution can then be sprayed at the rate from about ¾ to about 1 quart per gallon of bituminous emulsion-rubber latex composition.

Spraying is the most convenient manner of separately directing the aqueous emulsion composition and the chemical coagulant toward the surface of the body of fresh hydraulic cementitious composition to be treated. Two streams of material may be directed in the manner described in British Pat. 941,656, published Nov. 19, 1963; i.e., so that the emulsion and coagulant mix at the moment when the emulsion contacts the surface being coated. The air spraying equipment described in British Pat. 941,656 may also be used.

However, the preferred procedure and equipment is described in co-pending application Ser. No. 252,055, filed May 10, 1972, entitled Bituminous Emulsion-Rubber Latex Compositions and Method of Depositing Coagula Therefrom, assigned to the assignee of the present application. In accordance with the teachings of this co-pending application, deposited coagula having improved properties are achieved where the emulsion composition and coagulant are sprayed under liquid pressure, as distinguished from air pressure, and are directed along paths which converge so that the emulsion and coagulant mix thoroughly before contacting the surface being treated.

British Pat. 941,656 and co-pending application Ser. No. 252,055 are incorporated herein by reference to the extent necessary for a complete understanding of the prior art procedures for spraying emulsions and coagulants which are useful in the practice of the present invention. The thickness of the membranes may be varied over wide limits; in general thicknesses in the range of about 100 to about 200 mils is preferred and thicknesses in excess of 200 cannot be justified econonmically.

A series of concrete samples were prepared, cured and aged in accordance with ASTM C-156-70 entitled Water Retention Efficiency of Liquid Membrane Forming Compounds for Curing Concrete.

Three concrete samples were molded, weighed and placed in a curing cabinet at 100° F., 32% relative humidity for 1½ hours to cure.

Thereafter the samples were weighed again, the pan edges sealed with wax, and re-weighed.

Portable spraying equipment complete with containers of emulsion and coagulant was weighed. The emulsion composition consisted of 80 wt. percent of RS-1 as the bituminous ingredient and 20 wt. percent latex neoprene as the rubber latex ingredient, the remainder consisting of water. The coagulant consisted of 5 wt. percent aqueous solution of calcium chloride. The three concrete specimens were then sprayed following the teachings of co-pending application Ser. No. 252,055, filed May 10, 1972, i.e., using "airless" spray equipment and directing the emulsion composition and coagulant streams along paths which converged so that the two materials mixed thoroughly before contacting the surface of the concreate. The samples were then weighed again, placed in the curing cabinet, and the spray equipment was re-weighed. The over spray was determined by weighing the material deposited on paper placed under the samples and subtracting the weight of the previously weighted paper. The total weight of material sprayed onto the molded samples was determined by subtracting the over spray from the difference in the weight of the spray equipment before and after spraying.

A metal pilot plate of the same surface area as the molded concrete samples was also sprayed in a like manner to determine the loss of compound (essentially loss of water) during curing.

All the sprayed samples were placed in the curing cabinet for seventy-two hours, and were then removed and the samples weighed to determine weight loss. The test data are contained in the table below:

TEST RESULTS

|  | Weight in grams | | |
| --- | --- | --- | --- |
|  | No. 1 | No. 2 | No. 3 |
| Waxed weight | 7,120 | 7,083 | 7,082 |
| Compound weight* | 192 | 127 | 186 |
| Total weight** | 7,310 | 7,211 | 7,265 |
| 72-hour weight | 7,269 | 7,184 | 7,223 |
| Weight loss | 41 | 27 | 42 |
| Pilot plate weight | 610 | | |
| Compound weight* | 140 | | |
| Total weight** | 741 | | |
| Dried weight | 691 | | |
| Compound loss | 50 | | |

*Compound weight calculated by weighing the two spray guns before and after spraying. From these combined losses was subtracted the overspray determined by weighing the surrounding paper before and after spraying.
**Total weight is the actual observed weight after spraying.

These data indicate that while the pilot plate compound loss is indicated as 50 grams (the loss being water) the weight loss of the concrete samples (also presumed to be water) ranged from 27 to 41 grams. Seemingly, the concrete specimens lost less weight than did the compound deposited on the pilot plate. The conclusion to be drawn from this is that the aqueous emulsion composition in effect contributed water to the concrete specimen, which may have been used to hydrate the cement, and in this way was retained rather than lost through evaporation.

The test specimens were returned to the curing cabinet for an additional seven days and thereafter inspected. The membrane was well anchored to the concrete and provided a very satisfactory waterproofing covering therefor.

What is claimed is:

1. A method of curing a body of fresh hydraulic cementitious composition while simultaneously providing the resultant hardened composition with an adhering, permanent waterproof covering which comprises coating an exposed surface of said body by separately directing toward said surface an aqueous emulsion of at least one film forming material capable of producing a coagulum possessing low vapor transmitting properties and resistance to liquid water penetration, and a chemical coagulant for said emulsion, commingling said emulsion and said coagulant at or prior to contact with said exposed surface, whereby a waterproof membrane of low vapor transmission is formed in situ on the exposed surface of said body, and thereafter curing said body.

2. The method of claim 1 wherein said aqueous emulsion and chemical coagulant are commingled prior to contacting the exposed surface of said body.

3. The method of claim 1 wherein said hydraulic cementitious composition consists of concrete and said aqueous emulsion contains bituminous and rubber solids as film forming materials.

4. The method as defined in claim 1 wherein said composition comprises from about 2 to about 35 wt. percent synthetic rubber latex.

5. The method as defined in claim 1 wherein said chemical coagulant is a dilute aqueous solution of calcium chloride.

References Cited

UNITED STATES PATENTS

| 3,026,281 | 3/1962 | Harren et al. | 117—123 X |
| 3,085,907 | 4/1963 | Zdanowski et al. | 117—123 X |
| 3,106,486 | 10/1963 | Harren et al. | 117—123 |
| 3,275,579 | 9/1966 | Stierli | 117—123 X |
| 3,312,669 | 4/1967 | Giordana | 117—621 X |
| 3,354,169 | 11/1967 | Shafer et al. | 117—123 X |
| 3,518,107 | 6/1970 | Millen | 117—123 X |
| 3,567,496 | 3/1971 | Steinberg et al. | 117—123 X |
| 3,676,196 | 7/1972 | Quint et al. | 117—123 X |
| 3,689,305 | 9/1972 | Hausmann | 117—123 X |

FOREIGN PATENTS 941,656  11/1963  Great Britain _____ 117—123

WILLIAM D. MARTIN, Primary Examiner

M. R. LUSIGNAN, Assistant Examiner

U.S. Cl. X.R.

117—105.5, 163, 168